(12) United States Patent
Kato et al.

(10) Patent No.: US 10,739,038 B2
(45) Date of Patent: Aug. 11, 2020

(54) SOLAR HEAT COLLECTING DEVICE

(71) Applicant: Toyo Engineering Corporation, Tokyo (JP)

(72) Inventors: Yoshinobu Kato, Narashino (JP); Kiyoshi Satake, Narashino (JP)

(73) Assignee: TOYO ENGINEERING CORPORATION, Tokyo (JP)

( * ) Notice: Subject to any disclaimer, the term of this patent is extended or adjusted under 35 U.S.C. 154(b) by 774 days.

(21) Appl. No.: 15/327,254

(22) PCT Filed: Jun. 23, 2015

(86) PCT No.: PCT/JP2015/068002
§ 371 (c)(1),
(2) Date: Jan. 18, 2017

(87) PCT Pub. No.: WO2016/017323
PCT Pub. Date: Feb. 4, 2016

(65) Prior Publication Data
US 2017/0159972 A1    Jun. 8, 2017

(30) Foreign Application Priority Data
Jul. 29, 2014    (JP) .................................. 2014-153498

(51) Int. Cl.
*F24J 2/00*    (2014.01)
*F24S 20/25*    (2018.01)
(Continued)

(52) U.S. Cl.
CPC .............. *F24S 20/25* (2018.05); *F24S 23/70* (2018.05); *F24S 50/20* (2018.05); *F24S 2020/11* (2018.05);
(Continued)

(58) Field of Classification Search
USPC ........................................... 126/600; 136/217
See application file for complete search history.

(56) References Cited

U.S. PATENT DOCUMENTS 4,159,710 A * 7/1979 Prast ....................... F24S 50/20
126/582
2005/0126170 A1    6/2005 Litwin
(Continued)

FOREIGN PATENT DOCUMENTS

DE    102008008402 A1    8/2009
JP    2011137620 A    7/2011
(Continued)

OTHER PUBLICATIONS

EESR issued on Feb. 5, 2018 for the corresponding European Patent Application No. 15827831.7.
(Continued)

*Primary Examiner* — Avinash A Savani
(74) *Attorney, Agent, or Firm* — Troutman Pepper Hamilton Sanders LLP

(57) ABSTRACT

The present invention provides a solar heat collecting device having good heat collection efficiency. A uniaxial solar-tracking reflective mirror group is arranged such that each longitudinal axis thereof faces the same direction. A first biaxial solar-tracking reflective mirror group and a second biaxial solar-tracking reflective mirror group are arranged lined up in a direction orthogonal to the longitudinal axis direction of uniaxial solar-tracking reflective mirrors. The uniaxial solar-tracking reflective mirror group is arranged so as to be sandwiched on both sides by the first biaxial solar-tracking reflective mirror group and the second biaxial solar-tracking reflective mirror group. Each mirror group
(Continued)

sends solar heat received during uniaxial or biaxial tracking in accordance with the position of the sun, to a heat collecting device.

4 Claims, 3 Drawing Sheets

(51) Int. Cl.
*F24S 23/70* (2018.01)
*F24S 50/20* (2018.01)
*F24S 20/00* (2018.01)

(52) U.S. Cl.
CPC ...... *F24S 2023/87* (2018.05); *F24S 2023/872* (2018.05); *F24S 2023/876* (2018.05); *Y02E 10/40* (2013.01)

(56) References Cited

U.S. PATENT DOCUMENTS

| | | |
|---|---|---|
| 2008/0029150 A1 | 2/2008 | Quero et al. |
| 2009/0056699 A1 | 3/2009 | Mills et al. |
| 2009/0056701 A1 | 3/2009 | Mills et al. |
| 2009/0056703 A1 | 3/2009 | Mills et al. |
| 2009/0084374 A1 | 4/2009 | Mills et al. |
| 2011/0005513 A1 | 1/2011 | Mills et al. |
| 2011/0303214 A1 | 12/2011 | Welle |
| 2012/0240577 A1 | 9/2012 | Mandelberg et al. |
| 2013/0152916 A1 | 6/2013 | Tamaura |
| 2014/0138952 A1 | 5/2014 | Marumoto et al. |
| 2014/0352304 A1 | 12/2014 | Arias et al. |
| 2015/0167499 A1 | 6/2015 | Shinozaki et al. |

FOREIGN PATENT DOCUMENTS

| | | |
|---|---|---|
| JP | 2014092086 A | 5/2014 |
| WO | 2011/067773 A1 | 6/2011 |
| WO | 2012/042888 A1 | 4/2012 |
| WO | 2013/002054 A1 | 1/2013 |
| WO | 2013/033200 A2 | 3/2013 |
| WO | 2014/014027 A1 | 1/2014 |

OTHER PUBLICATIONS

Office Action dated Feb. 23, 2018 for the corresponding Chinese Patent Application No. 201580027375.X.
NEDO Renewable Energy Technology White Paper, 2nd Edition "Chapter 5 Solar thermal power generation and usage of solar heat".

\* cited by examiner

SOLAR HEAT COLLECTING DEVICE

CROSS-REFERENCE TO RELATED APPLICATIONS

This is a U.S. national phase application under 35 U.S.C. § 371 of International Patent Application No. PCT/JP2015/068002, filed Jun. 23, 2015, and claims benefit of priority to Japanese Patent Application No. 2014-153498, filed Jul. 29, 2014. The entire contents of these applications are hereby incorporated by reference.

TECHNICAL FIELD

The present invention relates to a solar heat collecting device.

BACKGROUND

Techniques for using sunlight and solar heat as the renewable energy source have been developed (See, for example, Japanese Unexamined Patent Application Publication No. 2011-137620, U.S. Patent Application Publication No. 2009/0056703 A, PCT International Application Publication No. WO 2012/042888 A and NEDO Renewable Energy Technology White Paper, 2nd Edition "Chapter 5 Solar thermal power generation and usage of solar heat"). The techniques using the solar heat that have been developed include the trough type solar thermal power generation system, the Fresnel type solar thermal power generation system, the tower type solar thermal power generation system, and the dish type power generation system, and the like which are classified according to how the light is collected. In these techniques, the solar tracking type reflection mirror for increasing the efficiency of collecting the solar heat and the rate of collecting the sunlight has been introduced. The solar tracking type reflection mirror drives a reflection mirror (heat collecting mirror) in accordance with the movement of the sun.

The solar tracking type reflection mirror includes a single-axial tracking type and a dual-axial tracking type. In the single-axial tracking type, the positional relation between the sun and the reflection mirror is adjusted along one axis. For example, the angle of the reflection mirror is changed one-dimensionally along the east-west axis only or along the north-south axis only in accordance with the daily movement of the sun. In the dual-axial tracking type, the positional relation between the sun and the reflection mirror is adjusted along two axes. For example, in accordance with the daily movement of the sun, the altitude of the sun is tracked while changing the angle of the reflection mirror and the azimuth of the sun is tracked by rotating the reflection mirror. Alternatively, the azimuth and the altitude of the sun are tracked by changing the angle of the reflection mirror along both the east-west axis and the north-south axis. The dual-axial tracking type reflection mirror is capable of precise angle control in the dual-axial direction. Therefore, in general, a reflection mirror with a smaller surface area than that of the single-axial tracking type reflection mirror executing the angle control only in the single-axial direction is employed. At present, the trough type solar thermal power generation system and the Fresnel type solar thermal power generation system employ the single-axial tracking type reflection mirror. On the other hand, the tower type solar thermal power generation system and the dish type solar power generation system employ the dual-axial tracking type reflection mirror.

SUMMARY

An object of the present invention is to provide a solar heat collecting device with higher heat collecting efficiency by using a single-axial solar tracking type reflection mirror group and a dual-axial solar tracking type reflection mirror group in combination.

To achieve the above described object, an embodiment of the present invention discloses a solar heat collecting device including: a single-axial solar tracking type reflection mirror group having a plurality of single-axial solar tracking type reflection mirrors selected from Fresnel type reflection mirrors and trough type reflection mirrors; a dual-axial solar tracking type reflection mirror group having a plurality of dual-axial solar tracking type reflection mirrors each including a surface area of 5 to 20% of a surface area of one of the single-axial solar tracking type reflection mirrors; and a heat collecting unit that collects heat by receiving reflection light from the single-axial solar tracking type reflection mirror group and the dual-axial solar tracking type reflection mirror group to transfer the heat from a first end to a second end in a length direction of the unit.

In the present invention, the single-axial tracking type reflection mirror group and the dual-axial tracking type reflection mirror group are combined. The surface area of one dual-axial tracking type reflection mirror can be set in the range of 5 to 20% or 5 to 15% of the surface area of one single-axial solar tracking type reflection mirror. As compared to the single-axial tracking type reflection mirror that collects the light into a line, the dual-axial tracking type reflection mirror that collects the light into a dot can adjust the positional relation between the sun and the reflection mirror more precisely and the light collecting rate higher. Therefore, the heat collecting efficiency (heat collecting capability per unit area of the reflection mirror) is high and the ultimate temperature is also high. For these reasons, as long as the heat collecting area of the entire reflection mirror group is the same, the combination of the single-axial tracking type reflection mirror group and the dual-axial tracking type reflection mirror group can achieve the higher heat collecting efficiency per unit area and ultimate temperature as compared to the single-axial tracking type reflection mirror group alone.

The shape of the dual-axial tracking type reflection mirror is not particularly limited. A square, rectangular, or circular shape may be employed. For example, the shape and size can be adjusted in accordance with the circumstances including the place where the solar heat collecting device is set (however, the above numeral range of the surface area needs to be satisfied).

As the heat collecting unit, a heat collecting tube, a heat collecting device, or a combination thereof is used. The heat collecting tube includes one or a plurality of tubes. The tube can have a medium (heat medium) therein. The heat medium flows from a first end side to a second end side in a direction of the length of the heat collecting tube. Therefore, heat is transferred from the first end side to the second end side. The heat medium may be known liquid (such as molten salt, hot oil, or water), gas (such as air, nitrogen, or carbon dioxide), or the like. The heat collecting device includes a solid heat medium (such as porous ceramics). Heat is transferred from a first end side to a second end side in a direction of the length, which is similar to the heat collecting tube.

In the solar heat collecting device according to the present invention, the single-axial solar tracking type reflection mirror group may be disposed so that long axes of the plural single-axial solar tracking type reflection mirrors face in a same direction. The dual-axial solar tracking type reflection mirror group may be divided into a first dual-axial solar tracking type reflection mirror group and a second dual-axial solar tracking type reflection mirror group. The first and second dual-axial solar tracking type reflection mirror groups may be disposed side by side in a direction orthogonal to a long-axis direction of the plural single-axial solar tracking type reflection mirrors. The single-axial solar tracking type reflection mirror group may be disposed sandwiched between the first and second dual-axial solar tracking type reflection mirror groups.

If the long-axis direction of the single-axial solar tracking type reflection mirror group coincides with the north-south direction, the first and second dual-axial solar tracking type reflection mirror groups are disposed side by side in the east-west direction relative to the north-south direction. The heat collecting efficiency and the light collecting degree can be increased by disposing the single-axial tracking type reflection mirror group and the dual-axial tracking type reflection mirror group as above.

In the solar heat collecting device according to the present invention, the single-axial solar tracking type reflection mirror group may be disposed so that long axes of the plural single-axial solar tracking type reflection mirrors face in a same direction. The dual-axial solar tracking type reflection mirror group may be disposed in a direction where long axes of the plural single-axial solar tracking type reflection mirrors extend and in a heat transfer direction.

When, for example, the heat collecting unit is a heat collecting tube, the heat medium is transferred from the first end side (upstream side) to the second end side (downstream side) (i.e., heat is transferred). Therefore, due to the heat collected by the single-axial solar tracking type reflection mirror group on the upstream side of the heat transfer, the temperature of the heat medium is increased. After that, the heat collection by the dual-axial solar tracking type reflection mirror group on the downstream side of the heat transfer can increase the light collecting degree. This further increases the temperature of the heat medium. Since the heat is collected in the two stages in this manner, the heat collecting efficiency and the light collecting degree can be increased, thereby increasing the temperature further.

In the solar heat collecting device according to the present invention, the single-axial solar tracking type reflection mirror group may be disposed so that long axes of the plural single-axial solar tracking type reflection mirrors face in a same direction. The dual-axial solar tracking type reflection mirror group may be divided into a first dual-axial solar tracking type reflection mirror group, a second dual-axial solar tracking type reflection mirror group, and a third dual-axial solar tracking type reflection mirror group. The first and second dual-axial solar tracking type reflection mirror groups may be disposed side by side in a direction orthogonal to a long-axis direction of the plural single-axial solar tracking type reflection mirrors. The single-axial solar tracking type reflection mirror group may be disposed sandwiched between the first and second dual-axial solar tracking type reflection mirror groups. The third dual-axial solar tracking type reflection mirror group may be disposed in a direction where long axes of the plural single-axial solar tracking type reflection mirrors extend and in a heat transfer direction.

The dual-axial solar tracking type reflection mirror groups can be disposed to surround three sides of the single-axial solar tracking type reflection mirror group with the three dual-axial solar tracking type reflection mirror groups. Thus, by increasing the heat collecting efficiency and the light collecting degree, the temperature can be increased.

The solar heat collecting device according to the present invention employs the combination of the single-axial solar tracking type reflection mirror group and the dual-axial solar tracking type reflection mirror group. If the total surface area of the reflection mirrors is same, when the single-axial tracking type and the dual-axial tracking type are combined, the heat collecting efficiency and the light collecting degree are higher than those when only the single-axial tracking type is used. Moreover, since one dual-axial tracking type reflection mirror has a small area, the mass production of the reflection mirror is possible. This enables the manufacturing cost reduction for the solar heat collecting device.

Figure 1:
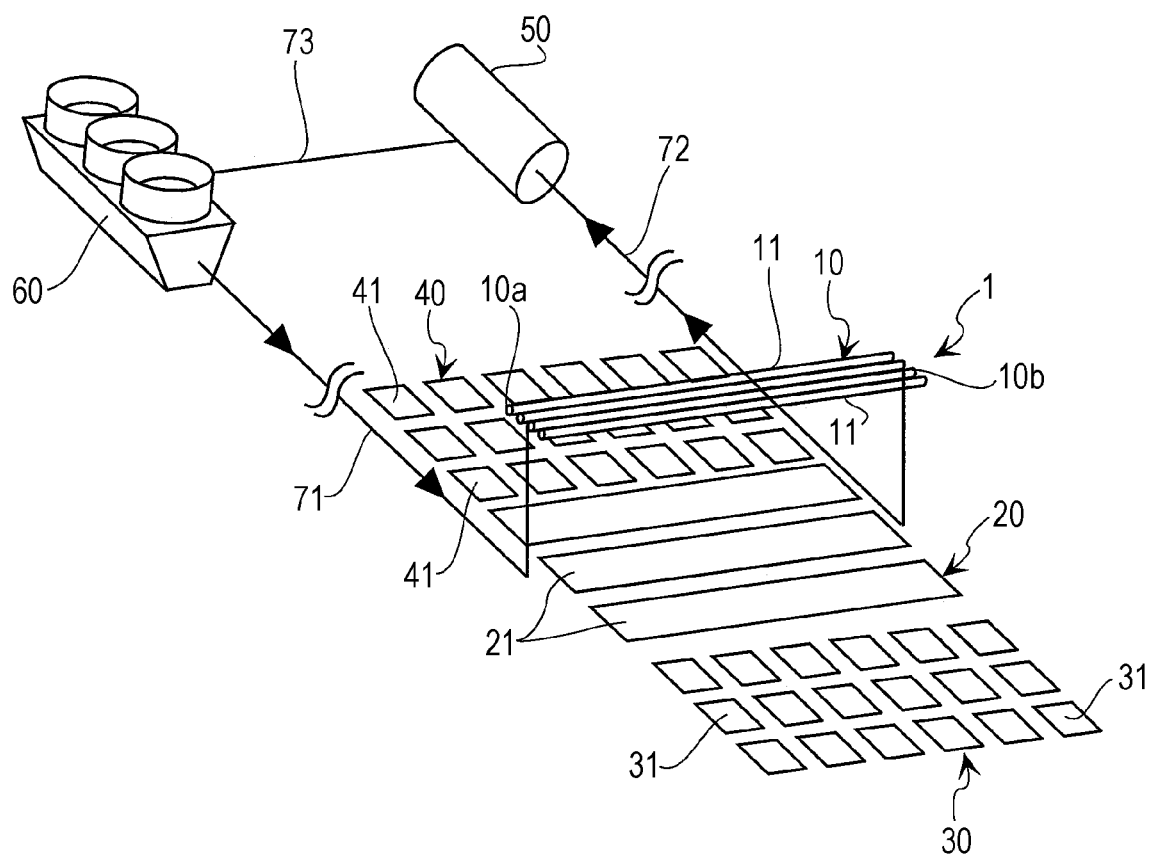
FIG. 1 is a perspective view of a power generation system in which a solar heat collecting device according to the present invention is used.
Figure 2:
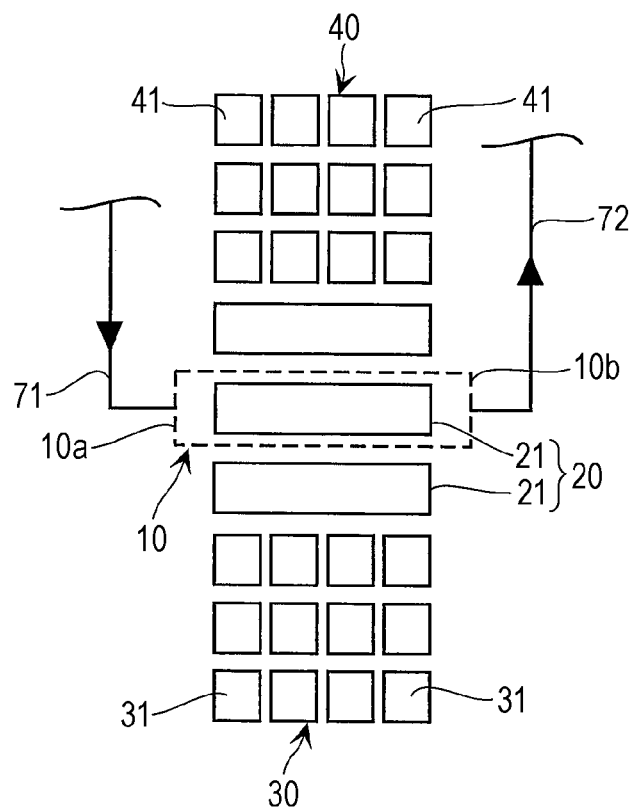
FIG. 2 is a plan view illustrating the arrangement of the reflection mirror groups included in the solar heat collecting device of FIG. 1 (however, the number of mirrors is different from that of FIG. 1).

DETAILED DESCRIPTION (1) Solar Heat Collecting Device of FIGS. 1 and 2

A solar heat collecting device 1 includes a single-axial solar tracking type reflection mirror group 20 and dual-axial solar tracking type reflection mirror groups 30 and 40.

The single-axial solar tracking type reflection mirror group 20 includes the combination of a required number of linear Fresnel type reflection mirrors 21. The linear Fresnel type reflection mirrors 21 are disposed at equal intervals in the width direction with their long axes facing in the same direction (for example, north-south direction).

A dual-axial solar tracking type reflection mirror group is divided into the first dual-axial solar tracking type reflection mirror group 30 and the second dual-axial solar tracking type reflection mirror group 40. The reflection mirror group 30 and the reflection mirror group 40 are disposed side by side in a direction orthogonal to the long-axis direction of the single-axial solar tracking type reflection mirror 21. Here, the single-axial solar tracking type reflection mirror group 20 is disposed sandwiched between the reflection mirror group 30 and the reflection mirror group 40. When the linear Fresnel type reflection mirrors 21 are disposed with their long axes facing in the north-south direction, the first dual-axial solar tracking type reflection mirror group 30 and the second dual-axial solar tracking type reflection mirror group 40 are disposed side by side in the east-west direction.

The first dual-axial solar tracking type reflection mirror group 30 includes the combination of a required number of reflection mirrors 31. The second dual-axial solar tracking type reflection mirror group 40 includes the combination of a required number of reflection mirrors 41. The number of mirrors of the first dual-axial solar tracking type reflection mirror group 30 may be either the same as or different from that of the second dual-axial solar tracking type reflection mirror group 40. The number of mirrors of the first dual-axial solar tracking type reflection mirror group 30 and the second dual-axial solar tracking type reflection mirror group 40 can be adjusted as appropriate in accordance with the intended amount of heat to be collected or the circumstances of the place to install.

Each of the surface area (area of a front surface that receives sunlight) of one reflection mirror 31 and the surface area of one reflection mirror 41 is approximately 10% of the surface area of one linear Fresnel type reflection mirror 21. For example, the reflection mirror 31 with an area of approximately 2×2 m and the reflection mirror 41 with the same degree of area can be used. The area is not limited to the above as long as the reflection mirror is capable of dual-axial control. FIGS. 1 and 2 illustrate the reflection mirrors 31 and 41 with a square shape. The reflection mirror, however, may have another shape.

In FIG. 1, the combination of a plurality of heat collecting tubes 11 is used as a heat collecting unit 10. Alternatively, a known heat collecting device or a heat collecting unit employing a method of heat, which has been obtained by the heat collecting tube 11, further in another solid (such as concrete molded body) may be used. The heat collecting unit 10 is installed right above the single-axial solar tracking type reflection mirror group 20 in FIGS. 1 and 2. The place to install the heat collecting unit 10 may be changed as appropriate in accordance with the circumstances of the place where the solar heat collecting device 1 is installed. The heat collecting unit 10 is installed by being supported by a supporter made of a metal column, frame, or plate.

Next, a method of operating the solar heat collecting device 1 according to the embodiment of the present invention is described with reference to a power generation system illustrated in FIG. 1. Here, description is made of the embodiment in which water is used as the heat medium flowing through the heat collecting tube 11. Water is sent from a water supply line 71 to the heat collecting tube 11 of the heat collecting unit 10. In the initial stage of the operation, water is supplied from a water source, which is not shown.

The single-axial solar tracking type reflection mirror group 20 reflects the sunlight received while single-axially tracking the position of the sun, and sends the light to the heat collecting unit 10. The first dual-axial solar tracking type reflection mirror group 30 and the second dual-axial solar tracking type reflection mirror group 40 reflect the sunlight received while dual-axially tracking the position of the sun, and send the light to the heat collecting unit 10. The water in the heat collecting unit 10 (heat collecting tube 11) turns into steam. The temperature of the steam can be determined in accordance with the necessary condition. In Japan, the temperature can be increased to be higher than or equal to 600° C. by increasing the light collecting rate.

After that, the steam is supplied to a power generation device 50 having a turbine and a power generator through a steam supply tube 72. The turbine is rotated by the steam supplied to the power generation device 50. The power is generated by transmitting the motive power, which is generated by the rotation of the turbine, to the power generator. The steam used in the rotation of the turbine is sent from a steam return line 73 to a condenser 60. The sent steam is returned to water after the condensation. After that, the generated water is supplied to the heat collecting unit 10 through the water supply line 71. In the time band when the sunlight can be used, the power generation using the solar heat can be continued by repeating the above circulation operation.

Figure 3:
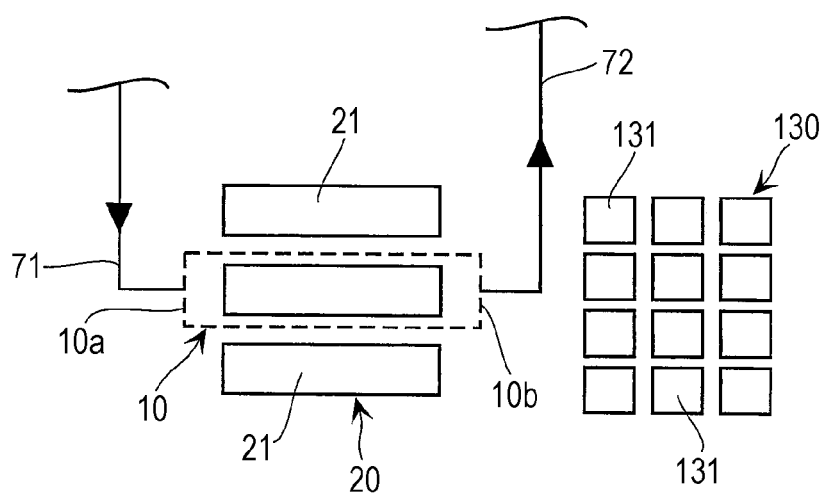
FIG. 3 is a plan view illustrating the arrangement of reflection mirror groups included in a solar heat collecting device according to an embodiment different from that of FIG. 1.

(2) Solar Heat Collecting Device of FIG. 3

In a solar heat collecting device of FIG. 3, the position of a dual-axial solar tracking type reflection mirror group 130 is different from that of the solar heat collecting device 1 of FIG. 1. The dual-axial solar tracking type reflection mirror group 130 is disposed in a direction where the long axes of the plural single-axial solar tracking type reflection mirrors 21 extend and in the heat transfer direction. Here, the heat transfer direction refers to the direction where the heat medium (water) of the heat collecting unit 10 (heat collecting tube 11) is transferred, and corresponds to the direction from a first end 10a to a second end 10b in the heat collecting unit 10 in FIG. 3. Since the number of dual-axial solar tracking type reflection mirror groups is smaller in FIG. 3, the shown example contains fewer reflection mirrors. However, the total number of reflection mirrors in the dual-axial solar tracking type reflection mirror group in FIG. 3 can be increased to be equal to the total number of reflection mirrors in the dual-axial solar tracking type reflection mirror group in FIG. 2.

When the water, which is the heat medium, is transferred from the first end (upstream) 10a to the second end (downstream) 10b in the heat collecting unit 10, first, water is heated by the sunlight reflected by the single-axial solar tracking type reflection mirror group 20 in the upstream side. After that, the water is further heated by the sunlight reflected by the dual-axial solar tracking type reflection mirror group 130 in the downstream side. In the solar heat collecting device of FIG. 3, the water as the heat medium is heated in the two stages as above.

Figure 4:
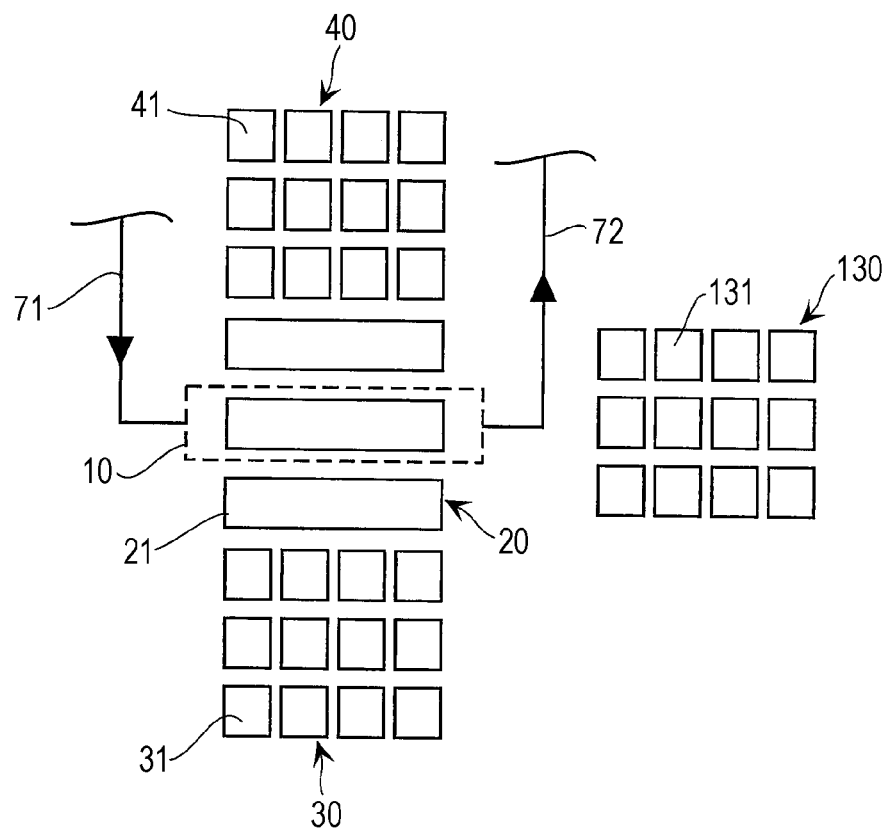
FIG. 4 is a plan view illustrating the arrangement of reflection mirror groups included in a solar heat collecting device according to an embodiment further different from that of FIG. 1.

(3) Solar Heat Collecting Device of FIG. 4

In the solar heat collecting device of FIG. 4, the reflection mirror groups in the solar heat collecting device of FIGS. 1 and 2 are combined. The single-axial solar tracking type reflection mirror group 20 includes the combination of a required number of linear Fresnel type reflection mirrors 21. The linear Fresnel type reflection mirrors 21 are disposed at equal intervals with their long axes facing in the same direction (for example, north-south direction).

A dual-axial solar tracking type reflection mirror group is divided into the first dual-axial solar tracking type reflection mirror group 30, the second dual-axial solar tracking type reflection mirror group 40, and the third dual-axial solar tracking type reflection mirror group 130. The reflection mirror groups 30 and 40 are disposed side by side in a direction orthogonal to the long-axis direction of the single-axial solar tracking type reflection mirror 21. Here, the single-axial solar tracking type reflection mirror group 20 is disposed sandwiched between the reflection mirror groups 30 and 40. The reflection mirror group 130 is disposed in a direction where the long axes of the plural single-axial solar tracking type reflection mirrors 21 extend, and in the heat transfer direction. Note that in FIG. 4, since the number of dual-axial solar tracking type reflection mirror groups is larger, the shown example contains more reflection mirrors. However, the total number of reflection mirrors in the three dual-axial solar tracking type reflection mirror groups can be decreased to be equal to the total number of reflection mirrors in the dual-axial solar tracking type reflection mirror group in FIG. 2.

The optimum arrangement can be selected from the arrangements of the dual-axial solar tracking type reflection mirror groups illustrated in FIGS. 2 to 4 in consideration of the space and the shape of the place where the solar heat collecting device according to the present invention is installed and how much sunlight the device can receive. On this occasion, the number of reflection mirrors included in one dual-axial solar tracking type reflection mirror group can be increased or decreased as appropriate. Moreover, the solar heat collecting device according to the present invention can be applied to improve the heat collecting efficiency of the existing solar heat collecting device which employs only the single-axial solar tracking type reflection mirror.

Figure 5:
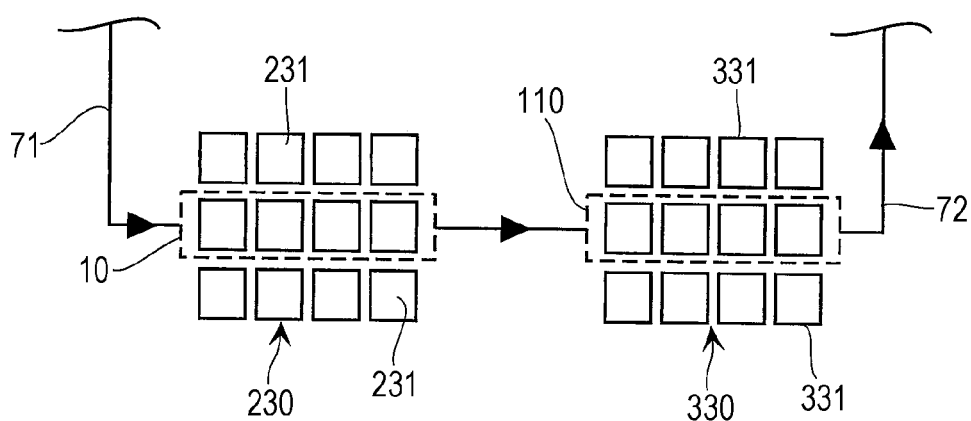
FIG. 5 is a plan view illustrating the arrangement of reflection mirror groups included in a solar heat collecting device in which only dual-axial solar tracking type reflection mirror groups are used.

(5) Solar Heat Collecting Device of FIG. 5

FIG. 5 illustrates the application example of the solar heat collecting device according to the present invention. In FIG. 5, two dual-axial solar tracking type reflection mirror groups 230 and 330, and two heat collecting units 10 and 110 are provided.

Of the two dual-axial solar tracking type reflection mirror groups, the first dual-axial solar tracking type reflection mirror group 230 is disposed on the upstream side of the heat transfer while the second dual-axial solar tracking type reflection mirror group 330 is disposed on the downstream side of the heat transfer. The first heat collecting unit 10 is disposed right above the first dual-axial solar tracking type reflection mirror group 230, and the second heat collecting unit 110 is disposed right above the second dual-axial solar tracking type reflection mirror group 330. In the operation, the heat medium heated by the first heat collecting unit 10 is further heated by the second heat collecting unit 110. The solar heat collecting device according to the embodiment of the present invention may be any one of the following first to fourth solar heat collecting devices.

The first solar heat collecting device is a solar heat collecting device including a reflection mirror group including a single-axial solar tracking type reflection mirror group and a dual-axial solar tracking type reflection mirror group, and a heat collecting unit for obtaining heat by collecting light from the reflection mirror group. The single-axial solar tracking type reflection mirror group includes a combination of a plurality of reflection mirrors selected from Fresnel type reflection mirrors and trough type reflection mirrors. The dual-axial solar tracking type reflection mirror group includes a combination of a plurality of dual-axial solar tracking type reflection mirrors having a surface area of 5 to 20% of a surface area of one of the single-axial solar tracking type reflection mirrors. The heat collecting unit is a heat collecting tube, a heat collecting device, or a combination thereof for collecting heat by receiving reflection light from the reflection mirror group and transferring the heat from a first end to a second end in a length direction thereof.

In the second solar heat collecting device according to the first solar heat collecting device, the single-axial solar tracking type reflection mirror group is disposed so that long axes of the plural single-axial solar tracking type reflection mirrors face in the same direction. The dual-axial solar tracking type reflection mirror group is divided into a first dual-axial solar tracking type reflection mirror group and a second dual-axial solar tracking type reflection mirror group on opposite sides in a direction orthogonal to a long-axis direction of the plural single-axial solar tracking type reflection mirrors.

In the third solar heat collecting device according to the first solar heat collecting device, the single-axial solar tracking type reflection mirror group is disposed so that long axes of the plural single-axial solar tracking type reflection mirrors extend in the same direction. The dual-axial solar tracking type reflection mirror group is disposed in a direction where the long axes of the plural single-axial solar tracking type reflection mirrors extend and in a heat transfer direction.

In the fourth solar heat collecting device according to the first solar heat collecting device, the single-axial solar tracking type reflection mirror group is disposed so that long axes of the plural single-axial solar tracking type reflection mirrors extend in the same direction. The dual-axial solar tracking type reflection mirror group is divided into a first dual-axial solar tracking type reflection mirror group and a second dual-axial solar tracking type reflection mirror group on opposite sides in a direction orthogonal to a long-axis direction of the plural single-axial solar tracking type reflection mirrors and a third dual-axial solar tracking type reflection mirror group is disposed in a direction where the long axes of the plural single-axial solar tracking type reflection mirrors extend and in a heat transfer direction.

The above descriptions regarding the particular embodiment of the present invention have been presented for the purpose of illustration. They are not intended to be exhaustive or to limit the present invention to the described forms as they stand. It is evident for those skilled in the art that a number of modifications or variations are possible in view of the above-described disclosures.

The solar heat collecting device according to the present invention can be used for the solar thermal power generation. The solar heat collecting device according to the present invention can also be applied to a hot water supply system or a heating system in which steam, hot water, or hot air is used. In the construction of the solar heat collecting device according to the present invention, the local procurement of materials and machinery can be increased. The increase in the local procurement is important to promote the plans for spreading the use of the solar energy.

The invention claimed is:

1. A solar heat collecting device comprising:
   a single-axial solar tracking reflection mirror group comprising a plurality of single-axial solar tracking reflection mirrors selected from Fresnel reflection mirrors and trough reflection mirrors;
   a dual-axial solar tracking reflection mirror group comprising a plurality of dual-axial solar tracking reflection mirrors each having a surface area of 5 to 20% of a surface area of one of the single-axial solar tracking reflection mirrors;
   a heat collecting unit that collects heat by receiving reflection light from the single-axial solar tracking reflection mirror group and the dual-axial solar tracking reflection mirror group to transfer the heat from a first end to a second end in a length direction of the unit, wherein:
   the single-axial solar tracking reflection mirror group is disposed so that long axes of the plural single-axial solar tracking reflection mirrors face in a same direction,
   the dual-axial solar tracking reflection mirror group is divided into a first dual-axial solar tracking reflection mirror group and a second dual-axial solar tracking reflection mirror group,
   the first and second dual-axial solar tracking reflection mirror groups are disposed side by side in a direction orthogonal to a long-axis direction of the plural single-axial solar tracking reflection mirrors, the single-axial solar tracking reflection mirror group is disposed sandwiched between the first and second dual-axial solar tracking reflection mirror groups, and the heat collecting unit is installed right above the single-axial solar tracking reflection mirror group in the direction of the long axes of plural single-axial tracking type reflection mirrors.

2. The solar heat collecting device according to claim 1, wherein:

the dual-axial solar tracking reflection mirror group is divided into the first dual-axial solar tracking reflection mirror group, the second dual-axial solar tracking reflection mirror group, and a third dual-axial solar tracking reflection mirror group; and the third dual-axial solar tracking reflection mirror group is disposed in a direction where long axes of the plural single-axial solar tracking reflection mirrors extend and in a heat transfer direction.

3. The solar heat collecting device according to claim 1, wherein the heat collecting unit is a heat collecting tube, a heat collecting device, or a combination thereof.

4. The solar heat collecting device according to claim 2, wherein the heat collecting unit is a heat collecting tube, a heat collecting device, or a combination thereof.

* * * * *